(12) United States Patent
Quinn

(10) Patent No.: US 10,663,053 B2
(45) Date of Patent: May 26, 2020

(54) CONTINUOUSLY VARIABLE TRANSMISSION AIR INTAKE ASSEMBLY

(71) Applicant: Deere & Company, Moline, IL (US)

(72) Inventor: Robbie B. Quinn, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 98 days.

(21) Appl. No.: 15/843,008

(22) Filed: Dec. 15, 2017

(65) Prior Publication Data

US 2019/0186620 A1     Jun. 20, 2019

(51) Int. Cl.
    *F16H 57/04*     (2010.01)

(52) U.S. Cl.
    CPC ..... *F16H 57/0416* (2013.01); *F16H 57/0489* (2013.01)

(58) Field of Classification Search
    CPC ........ B60K 11/06; B60K 11/08; B60K 13/02; B60K 13/06; F16H 57/0416; F16H 57/0489
    See application file for complete search history.

(56) References Cited

U.S. PATENT DOCUMENTS

| | | | |
|---|---|---|---|
| 5,086,858 A | 2/1992 | Mizuta et al. | |
| 5,976,044 A | 11/1999 | Kuyama | |
| 6,820,708 B2 | 11/2004 | Nakamura | |
| 7,363,999 B2 | 4/2008 | Hastings | |
| 7,686,123 B2 | 3/2010 | Ishida | |
| 8,079,602 B2 * | 12/2011 | Kinsman | B60G 15/063 280/5.512 |
| 8,157,039 B2 | 4/2012 | Melvin et al. | |
| 8,613,335 B2 * | 12/2013 | Deckard | F16H 57/0416 180/68.1 |
| 8,613,336 B2 | 12/2013 | Deckard et al. | |
| 8,746,719 B2 * | 6/2014 | Safranski | B60G 3/14 280/124.148 |
| 8,827,019 B2 | 9/2014 | Deckard et al. | |
| 8,827,020 B2 | 9/2014 | Deckard et al. | |
| 8,863,887 B2 | 10/2014 | Kii | |
| 8,997,908 B2 * | 4/2015 | Kinsman | B62D 21/183 180/89.1 |
| 8,998,253 B2 * | 4/2015 | Novotny | B60R 21/13 280/756 |
| 9,217,501 B2 | 12/2015 | Deckard et al. | |
| 9,327,587 B2 * | 5/2016 | Spindler | B62D 23/005 |
| 9,410,512 B2 | 8/2016 | Takahashi et al. | |
| 9,453,573 B2 * | 9/2016 | Renner | F16H 57/0489 |
| 9,512,809 B2 * | 12/2016 | Tsumiyama | F02M 35/162 |
| 9,528,595 B2 | 12/2016 | Itoo et al. | |
| 9,566,858 B2 * | 2/2017 | Hicke | B60K 11/04 |
| 9,587,548 B2 * | 3/2017 | Minnichsoffer | F01N 13/008 |
| 9,713,976 B2 * | 7/2017 | Miller | B60P 1/04 |

(Continued)

*Primary Examiner* — Katy M Ebner

(57) ABSTRACT

A continuously variable transmission air intake assembly includes an air intake opening facing laterally outwardly through a one-piece body panel at a location behind an off-road utility vehicle operator station, below a cargo box underside, and in front of a rear wheel and tire. An upper intake plenum may be attached to the one-piece body panel on an inward facing side of the air intake opening. A lower intake tube has a first end extending through a floor opening in the upper intake plenum and a second end connected to a continuously variable transmission housing.

14 Claims, 4 Drawing Sheets

(56) References Cited

U.S. PATENT DOCUMENTS

| | | | | |
|---|---|---|---|---|
| 9,776,481 | B2* | 10/2017 | Deckard | B62D 21/183 |
| 9,789,909 | B2* | 10/2017 | Erspamer | B60N 2/6009 |
| 9,884,647 | B2* | 2/2018 | Peterson | B60R 21/13 |
| 9,981,519 | B2* | 5/2018 | Despres-Nadeau | B60G 3/202 |
| 10,207,555 | B2* | 2/2019 | Mailhot | B62D 23/005 |
| 2018/0065465 | A1* | 3/2018 | Ward | B60K 5/10 |
| 2018/0178677 | A1* | 6/2018 | Swain | B60N 2/01 |
| 2018/0180163 | A1* | 6/2018 | Schleif | F16H 57/0416 |
| 2018/0222311 | A1* | 8/2018 | Toupin | F16H 57/0475 |
| 2018/0222403 | A1* | 8/2018 | Simard | B60R 7/06 |
| 2018/0306309 | A1* | 10/2018 | Steinert | F16H 57/0489 |
| 2018/0312025 | A1* | 11/2018 | Danielson | B60T 7/06 |
| 2019/0078679 | A1* | 3/2019 | Leclair | F16H 57/0416 |

* cited by examiner

CONTINUOUSLY VARIABLE TRANSMISSION AIR INTAKE ASSEMBLY

FIELD OF THE INVENTION

This invention relates to continuously variable transmissions for recreational or off road utility vehicles, and specifically to a continuously variable transmission air intake assembly.

BACKGROUND OF THE INVENTION

Continuously variable transmissions (CVTs) in recreational or off road utility vehicles use rubber belts to transmit torque between a drive clutch, or primary clutch, and a driven clutch, or secondary clutch. Higher horsepower and off-highway applications require a housing or enclosure to protect the CVT from damage caused by dirt or debris, water intrusion and excessive temperatures. A CVT air intake assembly may be provided with an air intake opening, along with tubing to direct air flow into the CVT housing or enclosure, protecting CVT components within the housing or enclosure.

In the past, some recreational or off road utility vehicles have CVT air intake assemblies with inboard-facing air intake openings. For example, inboard-facing air intake openings have been located under the seats, behind the seats, in the roll-over protective structure, or under the cargo box. CVT air intake assemblies with inboard-facing air intake openings may encroach on the seating area, fuel tank or under-seat storage. Other recreational or off road utility vehicles have CVT air intake assemblies with outboard-facing air intake openings. For example, outboard-facing air intake openings have been located in cargo box panels or vehicle fenders. CVT air intake assemblies with outboard-facing air intake openings may encroach on the sides, front or floor of the cargo box. Additionally, many CVT air intake assemblies may require replaceable air filters to clean the air, and lengthy tubing connecting the air intake opening to the CVT housing or enclosure.

A CVT air intake assembly for a recreational or off road utility vehicle is needed that does not encroach on the seating area, fuel tank or under-seat storage. A CVT air intake assembly is needed that does not encroach on the sides, front or floor of the cargo box. A CVT air intake assembly is needed that does not require a replaceable air filter or lengthy tubing between the air intake opening and CVT housing or enclosure. A low cost CVT air intake assembly is needed that provides clean air to the CVT and protects the CVT from damage due to dirt and debris, water intrusion and excessive temperature.

SUMMARY OF THE INVENTION

A CVT air intake assembly includes an air intake opening facing laterally outwardly through a one-piece body panel at a location behind an off-road utility vehicle operator station, below a cargo box underside, in front of a rear wheel and tire. The air intake opening may be positioned between a first lateral wall and a second lateral wall of the one-piece body panel. An upper intake plenum may be positioned at the inward facing side of the air intake opening, and a lower intake tube may extend between the upper intake plenum and a continuously variable transmission housing. The lower intake tube extends upwardly above a floor of the upper intake plenum and prevents water, dirt and debris from entering the lower intake tube.

The CVT air intake assembly does not encroach on the seating area, fuel tank or under-seat storage, and also does not encroach on the sides, front or floor of the cargo box. The CVT air intake assembly does not require a replaceable air filter or lengthy tubing between the air intake opening and CVT housing or enclosure. The CVT air intake assembly is low cost, provides clean air to the CVT, and protects the CVT from damage due to dirt and debris, water intrusion and excessive temperature.

DESCRIPTION OF THE PREFERRED EMBODIMENT

Figure 1:
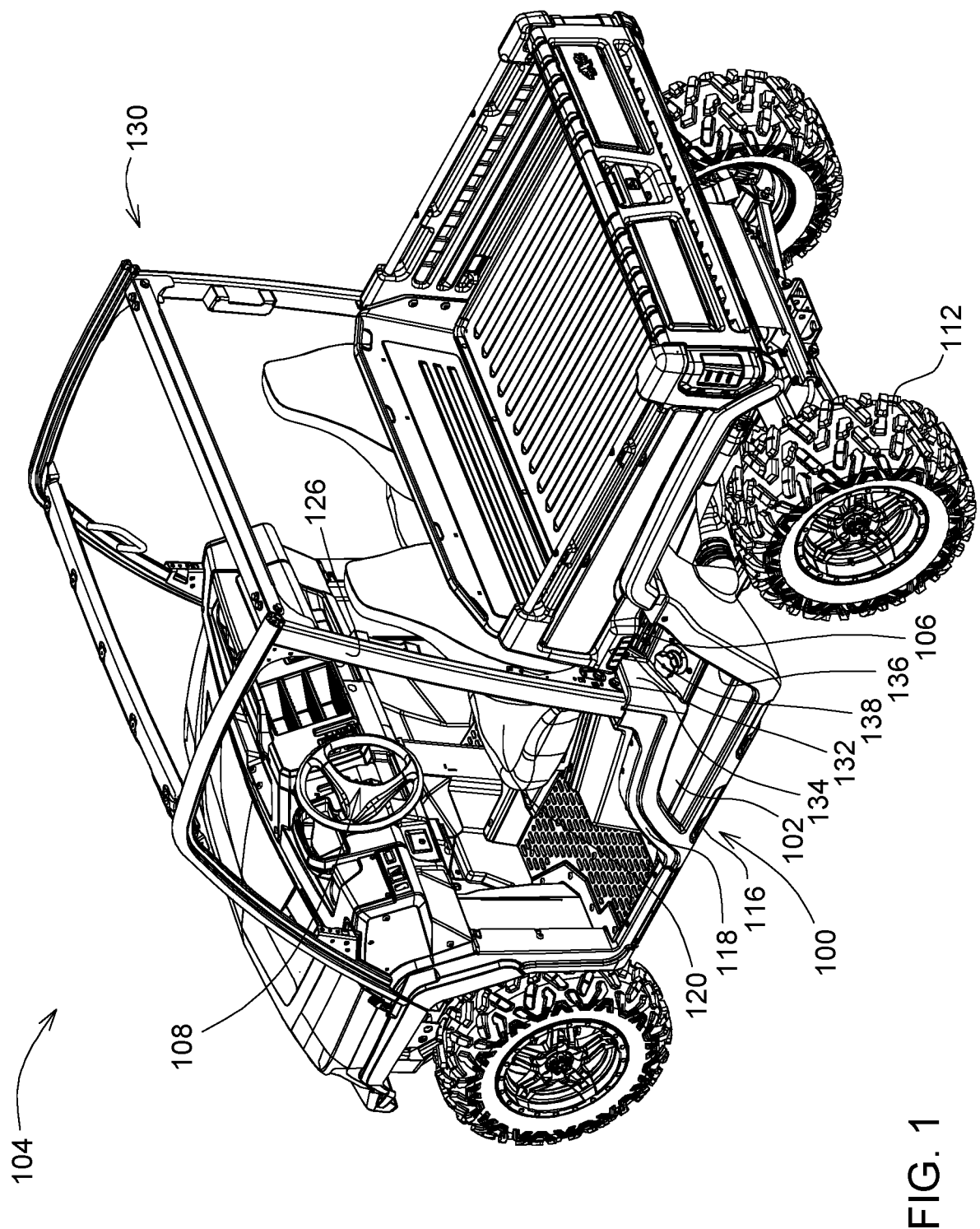
FIG. 1 is a top perspective view of a recreational or off-road utility vehicle with a CVT air intake assembly according to a first embodiment of the invention.
Figure 2:
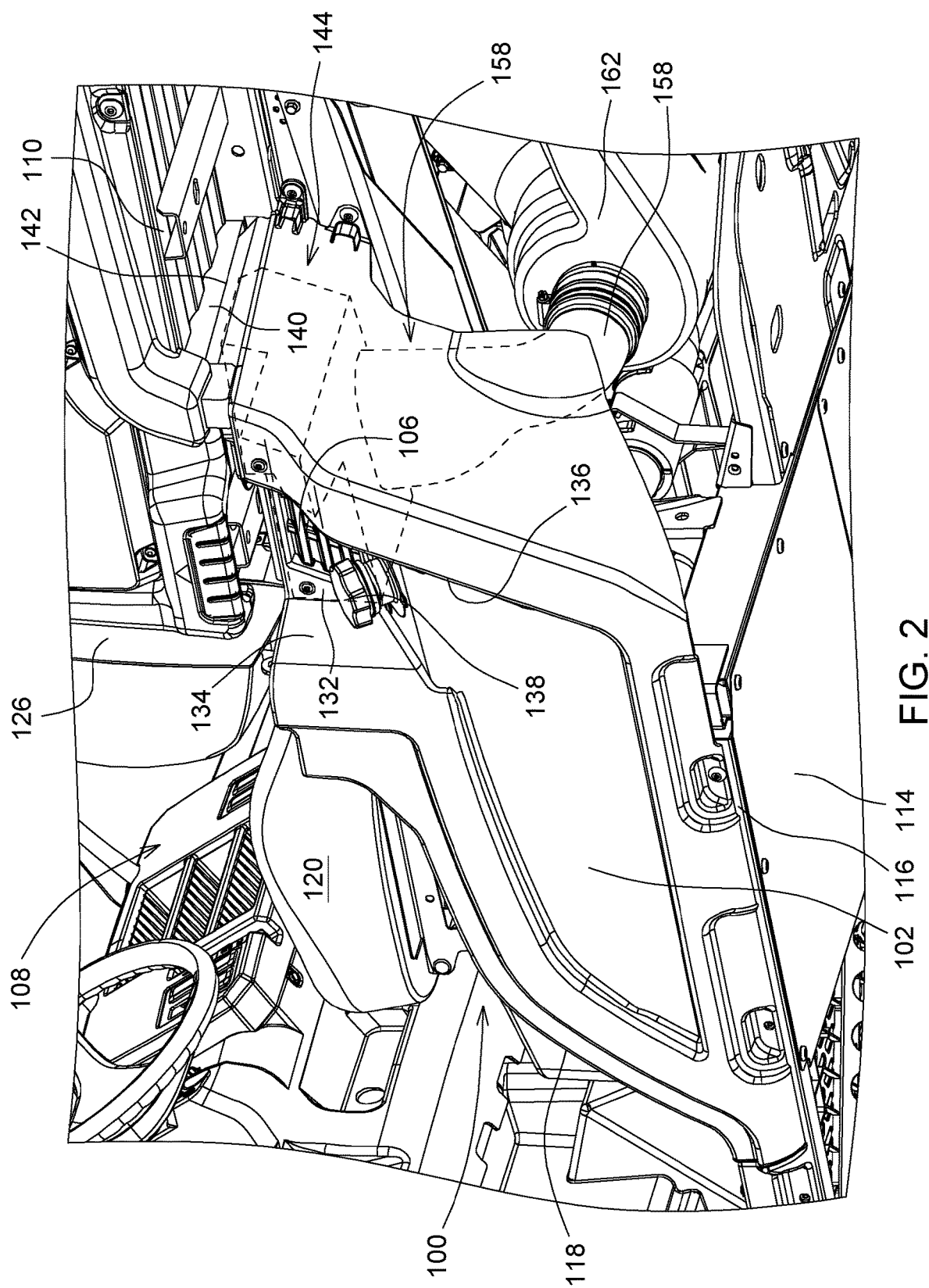
FIG. 2 is a side perspective view of a CVT air intake assembly according to a first embodiment of the invention.
Figure 3:
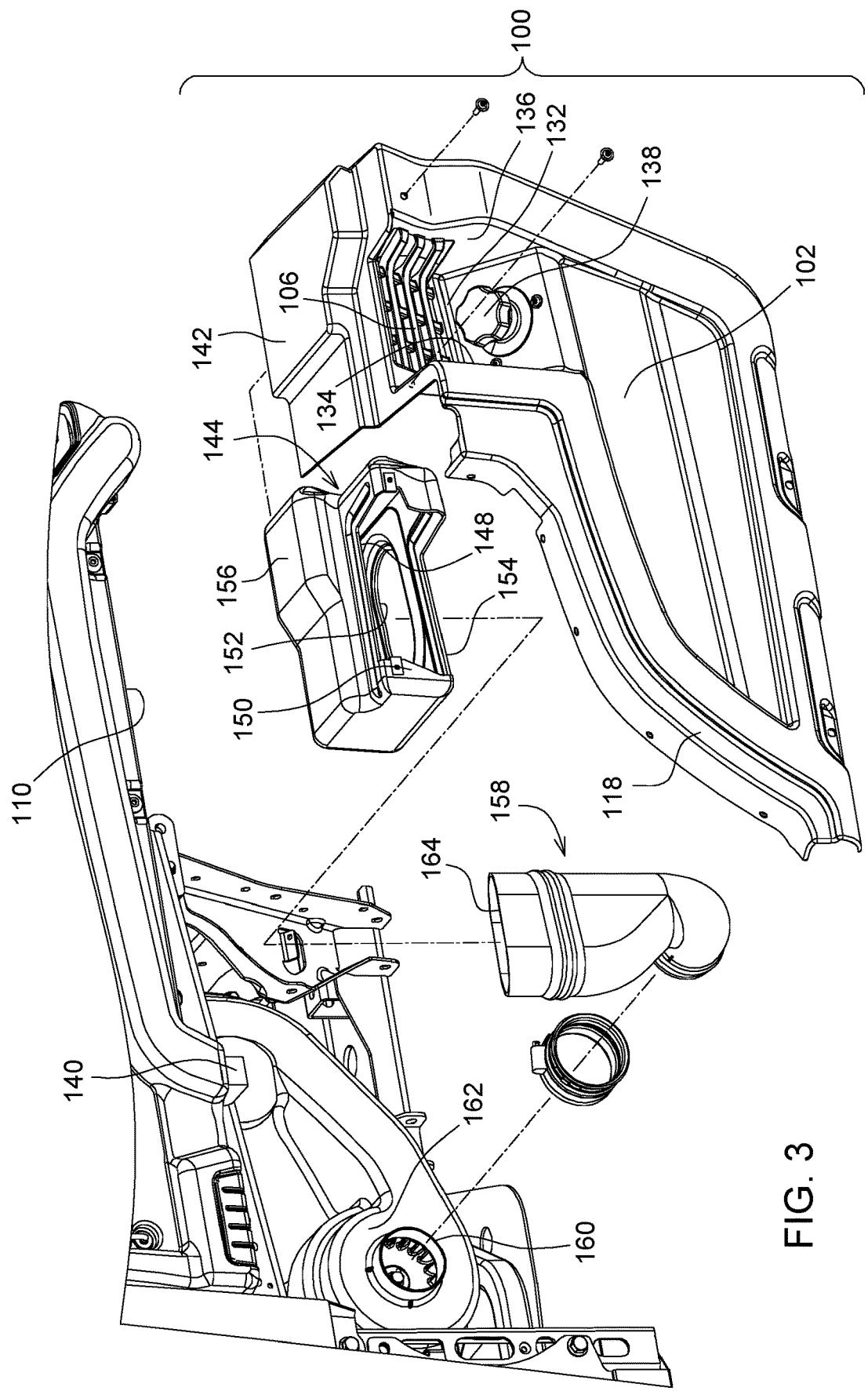
FIG. 3 is an exploded perspective view of a CVT air intake assembly according to a first embodiment of the invention.
Figure 4:
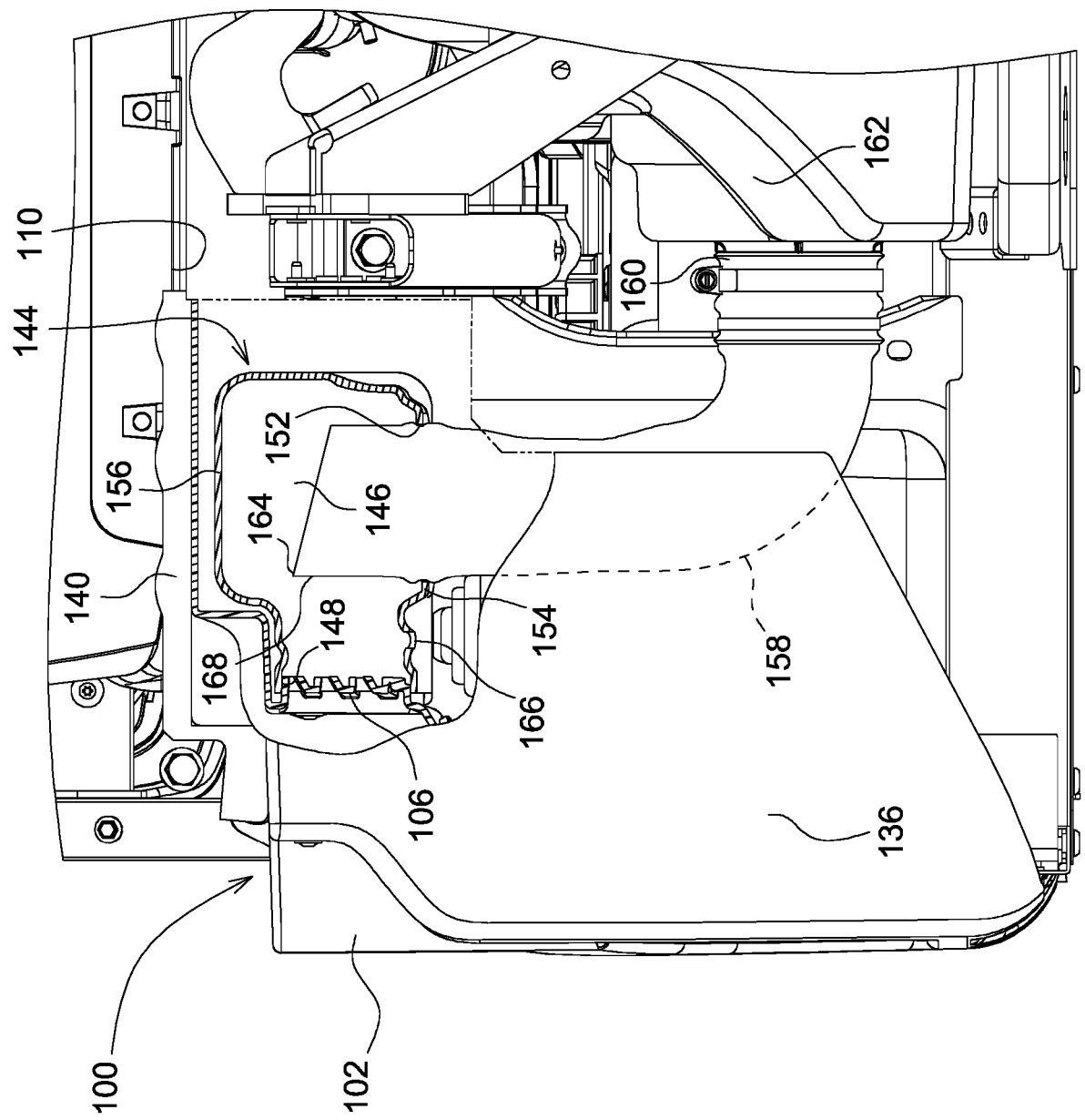
FIG. 4 is a side cross section view of a CVT air intake assembly according to a first embodiment of the invention.

In one embodiment shown in FIGS. 1-4, CVT air intake assembly 100 may be integrated into one-piece body panel 102 on recreational or off-road utility vehicle 104. The CVT air intake assembly may receive ambient air through air intake opening 106 molded into the one-piece body panel. The one-piece body panel may be molded plastic, rubber, sheet metal or other similar material, and may be secured to the floorboard and/or one or more frame members 116 of the utility vehicle, so that air intake opening 106 may be located at a height above floorboard 114 of the utility vehicle. The air intake opening also may be at a location completely behind operator station 108, below the underside of cargo box floor 110, in front of one of the rear wheels and tires 112, and facing laterally outwardly from the side of the one-piece body panel. The one-piece body panel may have a forward end 118 located below and laterally outside operator station 108 and operator seat(s) 120. For example, the forward end 118 of one-piece body panel 102 may be located in front of rear pillar 126 of cab 130 or the rear upright of an occupant protection system (OPS) or roll-over protective structure (ROPS) of a recreational or off-road utility vehicle.

In one embodiment, CVT air intake assembly 100 may include air intake opening 106 that provides a passage through recessed surface 132 between first and second lateral walls 134, 136 of one-piece body panel 102. First lateral wall 134 may be located immediately behind rear pillar 126. Second lateral wall 136 may be at the rearward end of one-piece body panel 102, located immediately in front of rear wheel and tire 112. The first and second lateral walls may extend laterally outwardly from the side of the utility vehicle at least about one inch past the air intake opening, and may shield the air intake opening from impacts, objects, or debris during normal driving of the vehicle. Optionally, fuel tank fill opening 138 also may be located at a recessed location between the first and second lateral walls.

In one embodiment, CVT air intake assembly 100 may include seal 140, which may be a foam pad or other compressible and resilient material, attached or adhered to the underside of cargo box floor 110. When the cargo box is in the latched or closed position, seal 140 may contact top surface 142 of one-piece body panel 102 directly above or adjacent second lateral wall 136, and immediately in front of rear wheel and tire 112. Seal 140 may contact and seal with the one-piece body panel when the cargo box is in the latched or closed position, thereby blocking and preventing water propelled or sprayed by rear wheel and tire 112 from entering air intake opening 106.

In one embodiment, CVT air intake assembly 100 may include upper intake plenum 144 attached to one-piece body panel 102 at a location on the inward facing side of air intake opening 106. The upper intake plenum may be molded plastic, rubber, sheet metal or other similar material, and may include a hollow box-shaped interior 146, side opening 148 in plenum wall 150, bottom opening 152 in plenum floor 154, and top cover 156. Top cover 156 may fit directly underneath top surface 142 of one-piece body panel 102. Top cover 156 also may be stepped, and at least part of the top cover may extend upwardly at least about 1 inch higher than the upper edge of side opening 148, which may be connected to the inside of air intake opening 106.

In one embodiment, CVT air intake assembly 100 may include lower intake tube 158 having a first or upper end 164 inserted through bottom opening 152 of upper intake plenum 144, and a second or lower end connected to inlet 160 of outer CVT housing 162. The first or upper end 164 may extend through bottom opening 152 of upper intake plenum 144, and may extend above plenum floor 154 sufficiently (preferably at least about 1 inch) to prevent water from entering the first or upper end of the lower intake tube. As a result, water may enter the upper intake plenum without entering the lower intake tube, and without entering the CVT housing or enclosure. One or more drain holes 166 in the plenum floor, and/or small gaps between lower intake tube 158 and bottom opening 152, may allow drainage of water out from the upper intake plenum. The outer surface 168 of lower intake tube 158 may disrupt or impede the airflow, and trap dirt and debris down onto the floor of the upper intake plenum instead of up into the lower intake tube. Additionally, the top of the lower intake tube may be sloped or angled away from side opening 148. As a result, the CVT air intake assembly may not require a filter element.

In one embodiment, CVT air intake assembly 100 allows air to flow into and through outer CVT housing 162 that encloses a drive clutch assembly, also referred to as a primary clutch, and a driven clutch assembly, also referred to as a secondary clutch. Each of the drive and driven clutch assemblies include a pulley that is split perpendicular to the axis of rotation. The CVT may be changed to any drive ratio between a lowest drive ratio and a highest drive ratio by moving the two sheaves of one pulley closer together and the two sheaves of the other pulley farther apart. By integrating the CVT air intake assembly into the one-piece body panel, cargo box width and capacity, and operator station volume may be maximized. Additionally, the CVT air intake assembly may be easily assembled, removed for cleaning out dirt and debris, and reassembled.

Having described the preferred embodiment, it will become apparent that various modifications can be made without departing from the scope of the invention as defined in the accompanying claims.

The invention claimed is:

1. A continuously variable transmission air intake assembly, comprising:
    an air intake opening facing laterally outwardly through a one-piece body panel at a location behind an off-road utility vehicle operator station, below a cargo box underside, and in front of a rear wheel and tire,
    an upper intake plenum attached to the one-piece body panel on an inward facing side of the air intake opening below the cargo box underside; and
    a lower intake tube having a first end extending through a floor opening in the upper intake plenum and a second end connected to a continuously variable transmission housing.

2. The continuously variable transmission air intake assembly of claim 1, wherein the air intake opening is in recessed surface between a first lateral wall and a second lateral wall of the one-piece body panel.

3. The continuously variable transmission air intake assembly of claim 1, further comprising a seal between an upper surface of the one-piece body panel and the cargo box underside.

4. The continuously variable transmission air intake assembly of claim 1, wherein the lower intake tube extends at least about 1 inch above the floor of the upper intake plenum.

5. The continuously variable transmission air intake assembly of claim 1, further comprising at least one water drainage hole in the upper intake plenum.

6. A continuously variable transmission air intake assembly, comprising:
    an air intake opening in a recessed surface between a first lateral wall and a second lateral wall on a side of an off-road utility vehicle;
    the first lateral wall located behind a rear pillar of an operator station of the utility vehicle, and the second lateral wall is located in front of a rear wheel and tire of the off-road utility vehicle;
    the first and the second lateral walls extending laterally outwardly from the side of the off-road utility vehicle past the air intake opening to shield the air intake opening;
    an upper intake plenum positioned at the inward facing side of the air intake opening and below the underside of a cargo area; and
    a lower intake tube extending between the upper intake plenum and a continuously variable transmission housing.

7. The continuously variable transmission air intake assembly of claim 6, wherein the first and the second lateral walls are part of a one-piece body panel.

8. The continuously variable transmission air intake assembly of claim 7, wherein the upper intake plenum is positioned under a top surface of the one-piece body panel; and a seal is positioned on the top surface of the one-piece body panel.

9. The continuously variable transmission air intake assembly of claim 6, wherein the lower intake tube extends upwardly above a floor of the upper intake plenum.

10. The continuously variable transmission air intake assembly of claim 9, wherein the upper intake plenum includes a stepped top cover.

11. A continuously variable transmission air intake assembly, comprising:
    an air intake opening on the side of an off-road utility vehicle;
    an upper intake plenum under a cargo box floor and having a side opening positioned behind the air intake opening;
    a lower intake tube having an upper end inserted through a bottom opening of the upper intake plenum and extending above a floor of the intake plenum to disrupt airflow from the side opening into the lower intake tube and block water from entering the first or upper end of the lower intake tube; and having a lower end connected to an inlet of an outer continuously variable transmission housing.

12. The continuously variable transmission air intake assembly of claim 11 wherein the air intake opening is through a one-piece body panel.

13. The continuously variable transmission air intake assembly of claim 11 wherein the air intake opening is positioned between a first and a second lateral wall.

14. The continuously variable transmission air intake assembly of claim 11 further comprising a seal between the air intake opening and the cargo box floor.

* * * * *